Feb. 27, 1934. F. M. NETZEL 1,949,175
MEANS OF MANUFACTURING STRIP SPONGE RUBBER
Filed Feb. 12, 1931 3 Sheets-Sheet 2
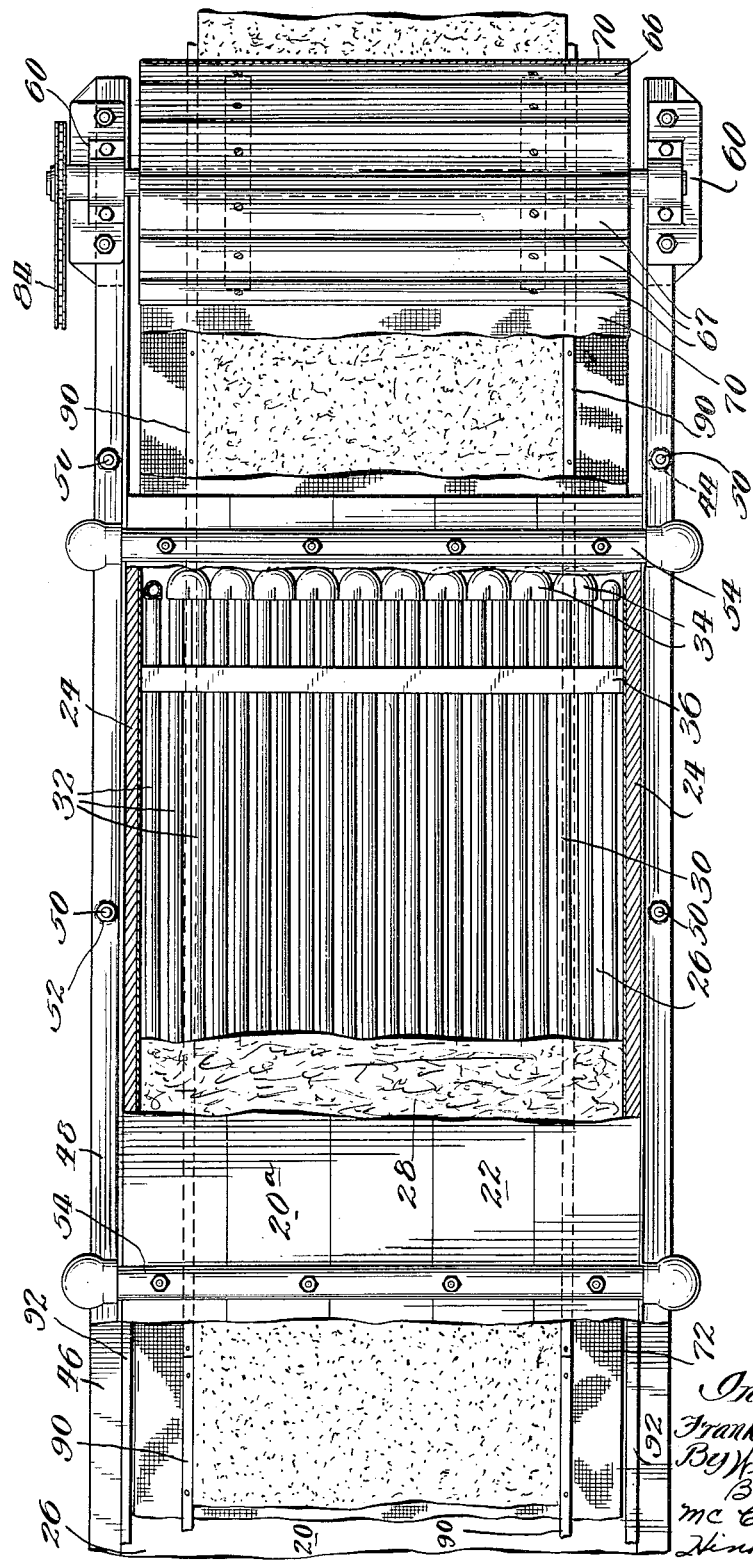

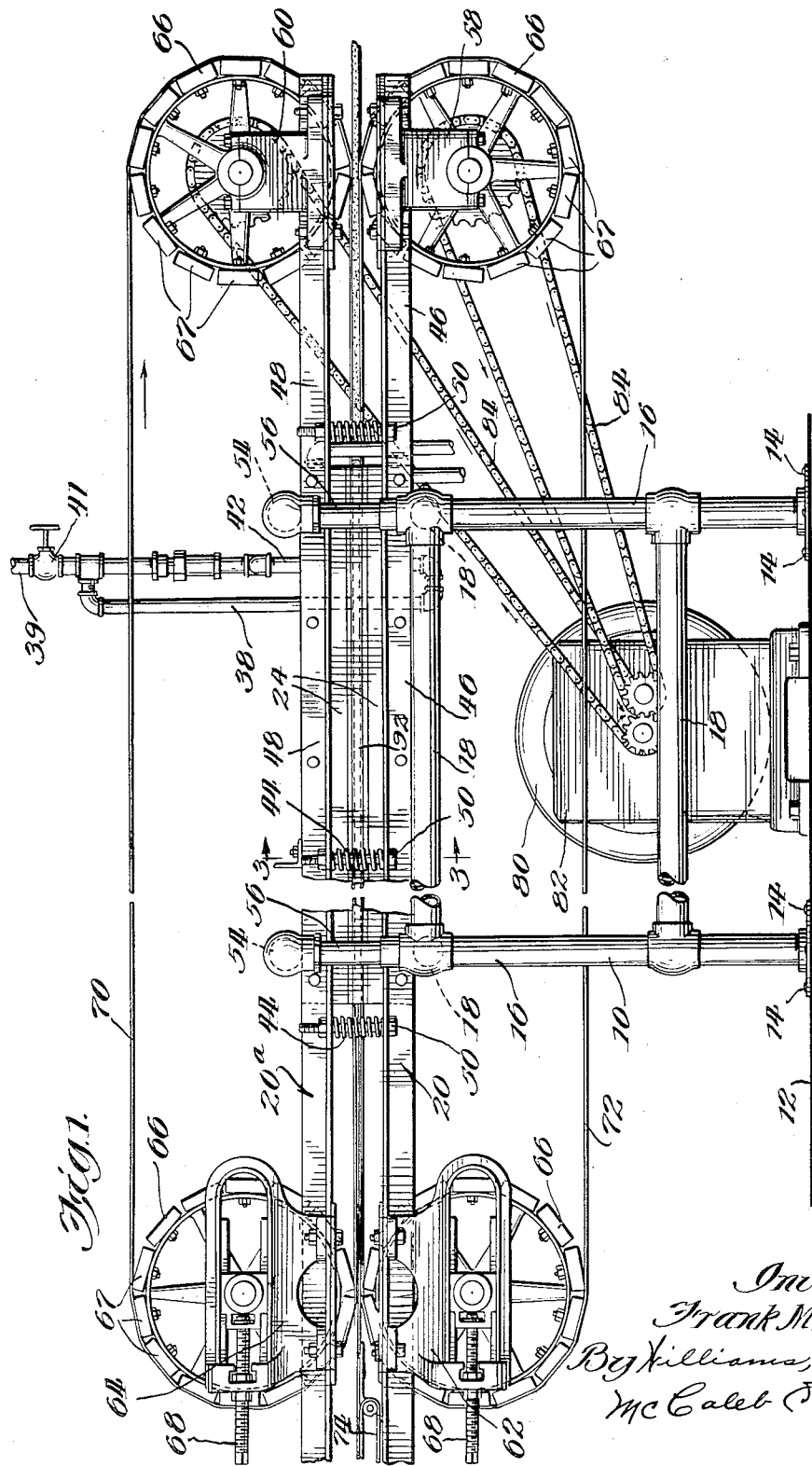

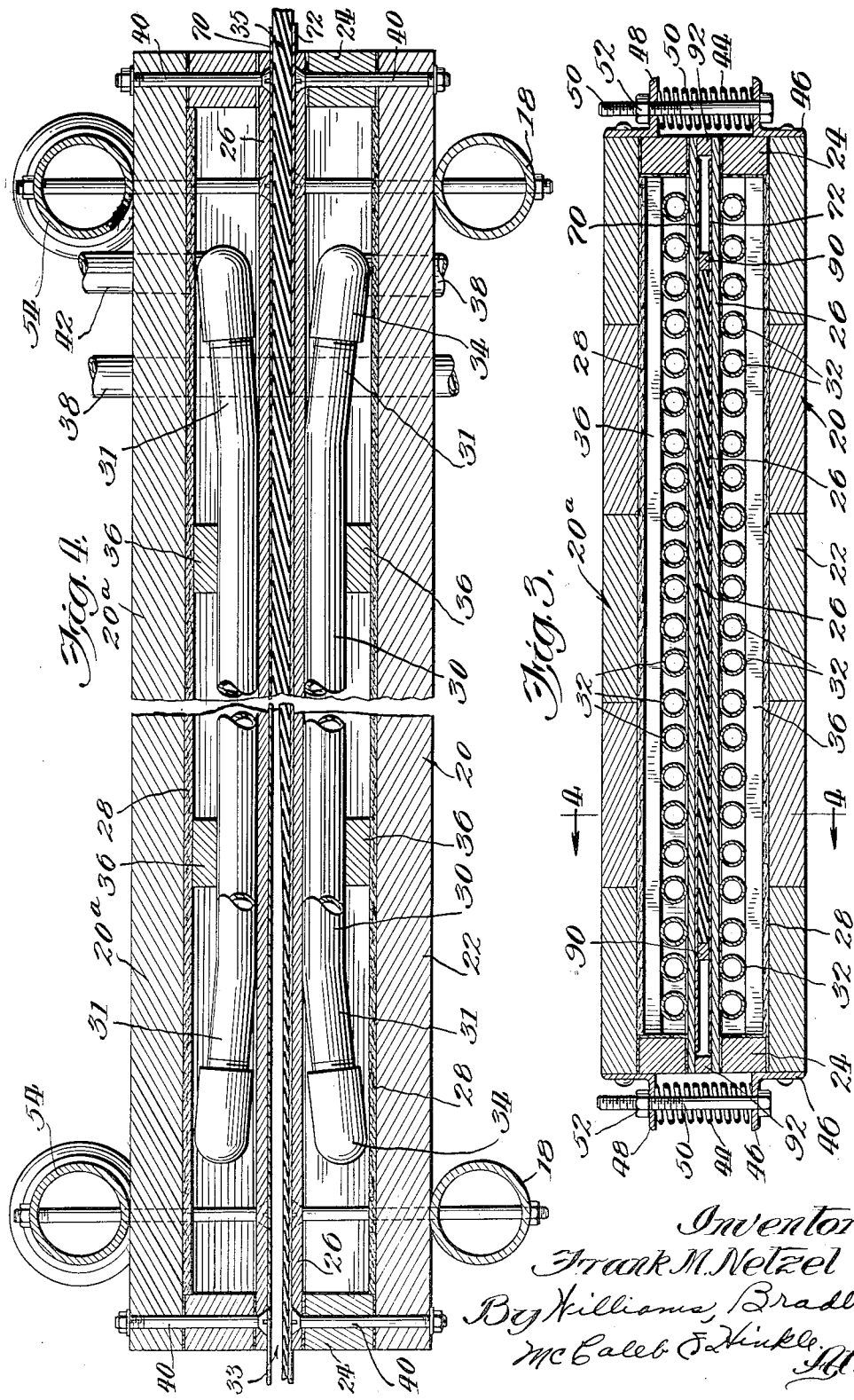

Patented Feb. 27, 1934

1,949,175

UNITED STATES PATENT OFFICE 1,949,175

MEANS OF MANUFACTURING STRIP SPONGE RUBBER

Frank M. Netzel, Chicago, Ill., assignor to Frost Rubber Works, Chicago, Ill., a partnership consisting of F. S. Frost and F. M. Netzel Application February 12, 1931. Serial No. 515,267

3 Claims. (Cl. 18—6)

My invention relates to the improved apparatus for manufacturing sponge rubber in continuous strips or strips of indeterminate length.

In comparatively recent years the use of sponge rubber in the manufacture of household equipment has been greatly increased. Bath rugs, door mats, kneeling mats, and floor coverings are now manufactured of many different shapes and designs. Many different lengths of floor coverings are desired, particularly since the recent indoor golf craze has swept the country and sponge rubber has been utilized for greens and fairways therefor. However, the sizes of rugs or mats attainable have always been limited by the size of the heating presses in which the mats have been cured.

Further, in view of the fact that many various objects such as soap holders, cleaning pads, toys, etc., are now manufactured of sponge rubber, it has been found desirable to cure the sponge rubber in strips of various lengths and widths to facilitate the handling thereof in manufacturing the articles mentioned above.

An object of my invention is the provision of improved apparatus for forming or curing a continuous strip of sponge rubber matting.

A further object is the provision of an improved apparatus for curing or heating sponge rubber fed into the apparatus in a continuous strip.

A further object is the provision of improved apparatus of the type described whereby the uncured or raw rubber composition is fed into the apparatus at one end and is baked while continuously moving between heating elements and whereby the baking or curing of the rubber before leaving the machine at the opposite end will be completely finished.

A further object is the provision in apparatus of this type of heating elements so arranged and insulated that the exterior of the apparatus will be comparatively cool, the heat being confined along the path of the rubber.

A further object is the provision in a machine of this type of a continuous conveyor for carrying a rubber composition between the heating elements at the desired rate of speed.

Other objects and advantages will readily be apparent from the following description, reference being had to the accompanying drawings, in which Fig. 1 is a side elevational view of my improved rubber curing machine, the middle portion of the machine being broken away;

Fig. 2 is a fragmentary plan view with parts broken away in section to more clearly show other parts;

Fig. 3 is a cross-sectional view through the heating elements, the view being taken on the line 3—3 of Fig. 1; and Fig. 4 is a fragmentary longitudinal sectional view taken generally on the line 4—4 of Fig. 3.

The apparatus I have shown for carrying out my improved process may comprise a supporting framework 10 constructed of piping and positioned upon the floor 12 and secured thereto by a plurality of fastening means 14. The supporting framework 10 may comprise the tubular uprights 16 rigidly fastened together by suitable cross braces 18. A pair of the braces 18 may extend transversely to the opposite side of the machine and connect with similar framework 10 upon the opposite side of the machine. A table portion 20 is rigidly secured upon the cross braces 18 and may comprise a housing wherein steam coils are arranged. The table 20 may be in the form of a housing constructed of a wooden bottom wall 22, suitable wooden side walls 24, and a flat metallic plate 26 which comprises the upper wall or cover plate of the housing. A layer of asbestos or other heat insulation 28 is placed upon the bottom wall 22.

A heating coil 30, which may comprise a plurality of parallel pipes 32 having their ends connected by suitable U members 34, is positioned in the housing, being spaced from the lower wall 22 by a plurality of wooden cross bars 36 upon which the coil is placed. A steam inlet pipe 38 is connected with the coil 30 and extends upwardly through a suitable opening in the bottom wall 22. The coil 30 is so arranged in the housing that when the upper plate 26 is placed in position the coils will contact the plate throughout their entire length except at their ends where they are bent downwardly from the plate for a reason which will be more clearly described hereinafter.

The plate 26 is secured in position by suitable bolts 40 which extend through the side walls 24 and through the bottom wall 22. The table 20, as thus constructed, comprises a compact heating unit or oven wherein, upon the admission of steam to the heating coil 30, the upper plate 26 is adapted to be quickly and efficiently heated, due to the contact between the steam coils and the lower side of the plate. Due to the fact that the side walls and the bottom wall are insulated, the heat will all be directed upwardly against the metallic upper plate and the side walls and the bottom wall will not become materially heated.

A heating unit 20a, similar in all respects to table 20, is provided directly above table 20. This unit, however, is inverted above table 20 so that the metallic cover plate 26 thereof will face the metallic cover plate 26 of the table. A similar heating coil 30 is contained in the unit and steam may enter this unit by means of a suitable pipe 42. Both the inlet pipes 38 and 42 are connected to a steam line 39 by suitable pipe connections. A shut-off valve 41 is provided to govern the amount of steam entering the heating coils.

As previously stated, coils 30 are adapted to be placed in the heating units resting against the metallic plates 26. However, a portion 31 of each end of the coils is shown diverging from the plate. By thus placing the coils, the plates 26 will be fairly cool at the entrance 33 and the exit 35, thus allowing the uncured rubber which enters to become gradually heated, and as the cured rubber passes out it becomes gradually cooled. This arrangement has been found to have a very beneficial effect upon the curing of the rubber and is directly attributable to the novel arrangement of the heating coils and plates.

The unit 20a is supported from the table 20 by means of coil springs 44 which are positioned between angle bars 46 secured to the sides of table 20, and angle bars 48 secured to the sides of unit 20a.

An adjusting bolt 50 extends through suitable openings in the angle bars and is provided with a nut 52 whereby the distance between the two faces of the heating units may be adjusted. Means for guiding the unit 20a during this adjustment is provided and comprises the frame members 54 which extend transversely across the top of unit 20a and are rigidly secured thereto. These members are connected to downwardly extending pipe members 56 which are adapted to slidably engage in the tubular uprights 16 of the supporting framework to guide the unit 20a in a vertical path.

The angles 46 and 48 extend beyond the ends of units 20 and 20a and support at their extremities pairs of bearing brackets 58, 60, 62 and 64. Each pair of brackets which are on opposite sides of the machine, supports a vertical shaft upon which a roller 66 is mounted. Brackets 64 and 62 are further provided with means 68 for laterally adjusting their respective shafts. Any suitable means may be employed, hence the details thereof will not be described. An endless belt 70 is trained upon the upper pair of rollers 66 and an endless belt 72 is trained upon the lower set of rollers 66. Both of these belts may be made of a canvas material through which heat readily penetrates. These belts, as can readily be seen, are adapted to pass between the opposed faces 26 of the heating units 20 and 20a, respectively. Any suitable conveyor 74 for moving uncured rubber into position before the rollers 66 may be provided at the left end of the machine. Rollers 66 may be of any suitable design, but I prefer to use a roller provided with a plurality of flat wooden slats 67 which firmly grip the rubber and move it forward. This is particularly true at the exit end of the machine.

In operation, uncured rubber is placed upon the conveyor 74 and moved to position between the front pair of rollers 66. These rollers are driven at a suitable rate of speed by the motor 80 which operates through a suitable variable speed reducer 82 and chains 84 to drive the rollers in opposing direction so that the belts 70 and 72 face each other and move forward together between the heating units 20 and 20a. The rate of speed with which they travel is also regulatable so that the proper curing time may be allowed.

Means for guiding the uncured rubber into and through the apparatus is provided. When a strip of a particular width is desired, the uncured rubber is cut to the desired width and guide bars 90 are placed on the sides thereof and accurately spaced apart by any suitable means. The bars are then allowed to pass through the apparatus with the rubber.

To regulate the thickness to which the rubber rises during the curing or blowing process, gauges 92 are placed between the plates 26, just beyond the edges of the belts 70 and 72. The nut 52 is then screwed down on bolt 48 until the gauges 92 are firmly clamped in position.

By actual experiment, I have found that sponge rubber 3/8 inch to 3/4 inch thick may be run through my improved machine at the rate of 1 1/2 ft. per minute. The speed thereof is of course determined by the thickness desired. The increased efficiency of my apparatus is thus readily apparent over the prior art. The ease of adjustability, the novel method of insulation, and the ease of operation, are all features which add to the beneficial results obtained from the use of my machine.

While I have illustrated and described a particular embodiment of my apparatus, I desire it to be strictly understood that I do not wish to be limited in any particular. Rather, what I desire to secure and protect by Letters Patent of the United States is:

1. A machine for curing sponge rubber strips comprising a supporting framework, a rectangular box-like housing positioned thereon, a similar housing adjustably supported above said housing, a metal plate on each housing, said plates positioned adjacent each other, a heating coil in each housing supported contacting the plates except for a short distance at each end, a pair of spaced non-insulated conveyor belts positioned between said plates adapted to convey uncured rubber therebetween, and guide means arranged to be carried by said conveyors to define the width and thickness of the rubber strips.

2. Apparatus of the type described comprising a support, an insulated table mounted thereon having a flat rectangular upper heating surface, an insulated housing mounted above said table having a similarly downwardly facing heating surface, said housing resiliently supported above said table, a pair of spaced endless conveyors adapted to move between said heating surfaces and to support a strip of rubber therebetween, and heating coils in both said housing and said table lying adjacent the opposed heating surfaces to cure said rubber.

3. A machine for curing sponge rubber strips comprising a supporting framework, a rectangular box-like housing positioned thereon, a similar housing adjustably supported above said housing, a metal plate on each housing, said plates positioned adjacent each other, a heating coil in each housing supported contacting the plates except for a short distance at each end, and a pair of spaced non-insulated conveyor belts positioned between said plates and adapted to convey uncured rubber therebetween.

FRANK. M. NETZEL.